United States Patent [19]

Loukonen

[11] 4,442,866

[45] Apr. 17, 1984

[54] SLIDING SEPARATOR FOR PULSATING LINES

[76] Inventor: Ernest W. Loukonen, Box 1611, Long Beach, Calif. 90815

[21] Appl. No.: 423,855

[22] Filed: Sep. 27, 1982

[51] Int. Cl.³ ............................................. F16L 55/04
[52] U.S. Cl. ...................................... 138/31; 138/104; 138/30
[58] Field of Search ........................... 138/30, 31, 104

[56] References Cited

U.S. PATENT DOCUMENTS

| | | | |
|---|---|---|---|
| 2,290,337 | 7/1942 | Knauth | 138/30 |
| 2,492,014 | 12/1949 | Spalding et al. | 138/30 |
| 2,695,037 | 11/1954 | McCuistion | 138/31 |
| 2,764,997 | 10/1956 | McCuistion | 138/31 |
| 3,379,216 | 4/1968 | Mercier | 138/30 |
| 4,186,775 | 2/1980 | Muroi | 138/30 |
| 4,307,753 | 12/1981 | Dryer | 138/30 |

FOREIGN PATENT DOCUMENTS

| | | | |
|---|---|---|---|
| 1078564 | 11/1954 | France | 138/30 |
| 1183477 | 3/1970 | United Kingdom | 138/31 |

*Primary Examiner*—John W. Shepperd
*Attorney, Agent, or Firm*—Boniard I. Brown

[57] ABSTRACT

A separator is positioned to prevent pulsating fluid from mixing with working fluid or from contaminating dampening devices when dampening pulsations or eliminating cavitation. The separator includes a cylinder connected at one end to the source of pulsating fluid and the other to pressurized working fluid, such as is used in a pulsation dampeners or cavitation eliminators, with a sliding elastomeric piston positioned in the cylinder therebetween. A diaphragm is formed at the center of the piston. The diaphragm is protected by perforated cages on either side thereof and acts to transfer high frequency vibrations directly across the piston. The piston is free to slide upwardly and downwardly within the cylinder to transfer lower frequency pulsations. A lubrication grease fitting is provided adjacent one end of the cylinder for lubricating the piston when it is positively located against one of two opposite interior stops within the cylinder.

10 Claims, 7 Drawing Figures

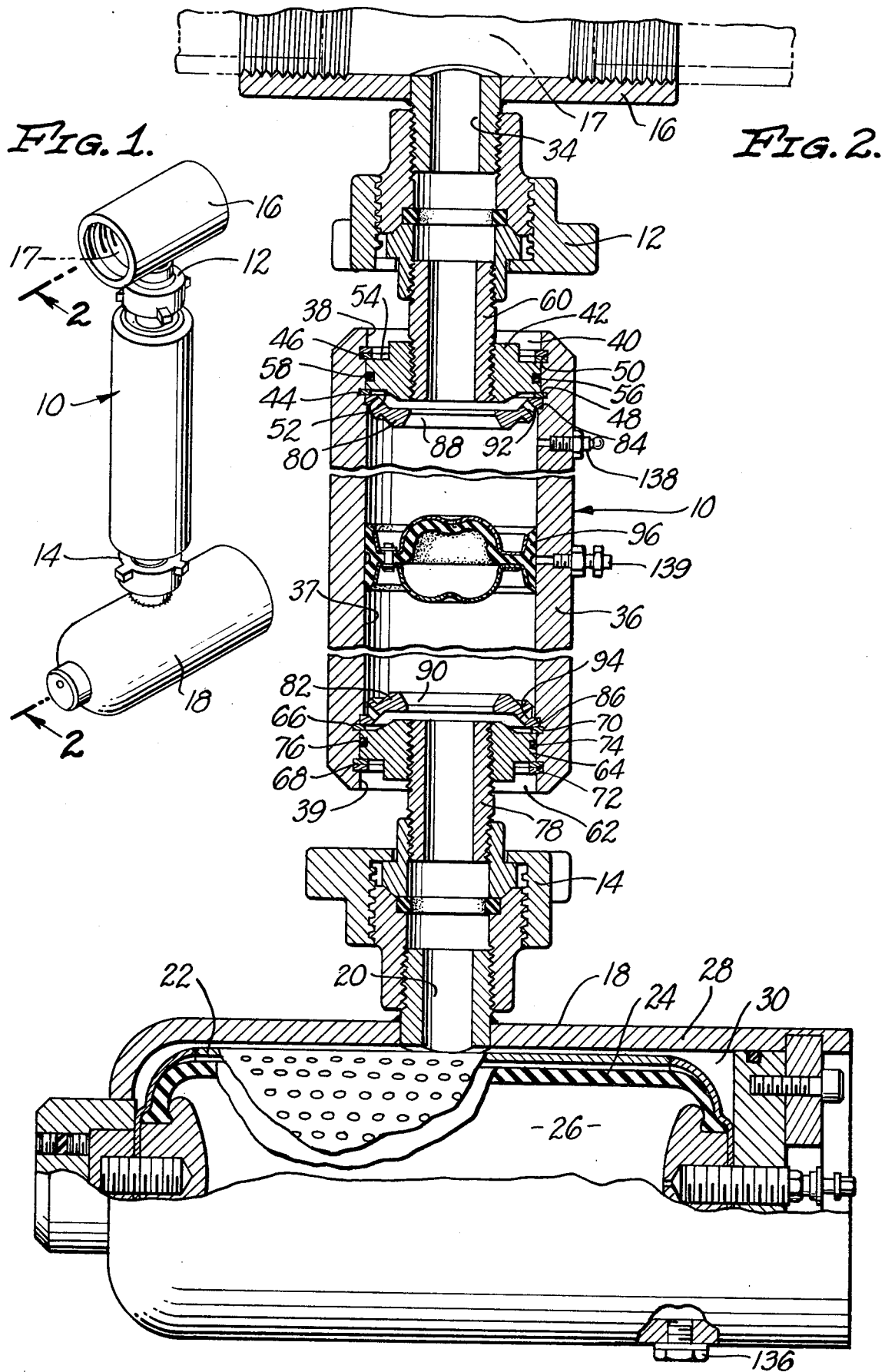

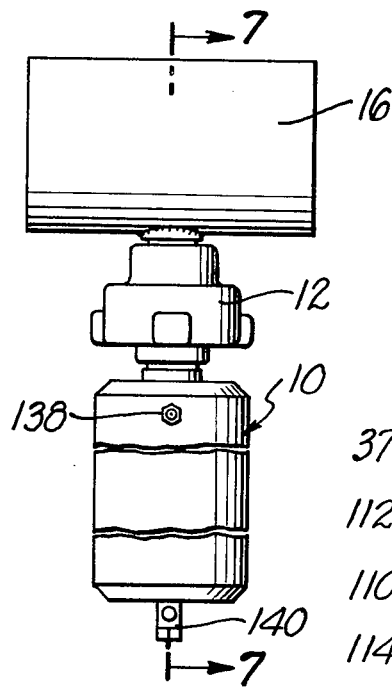
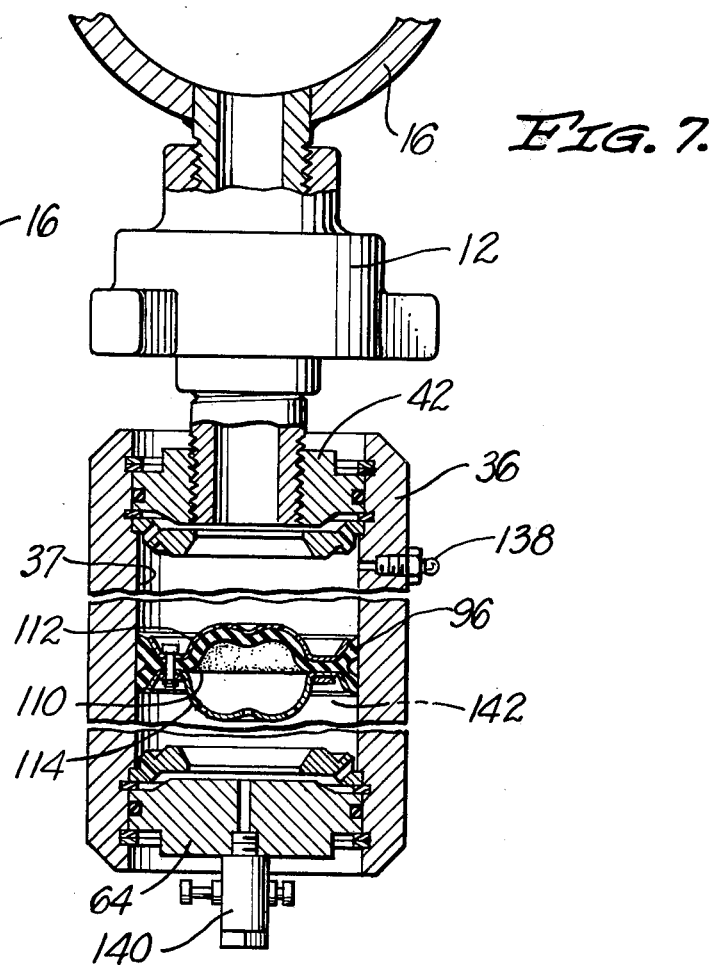
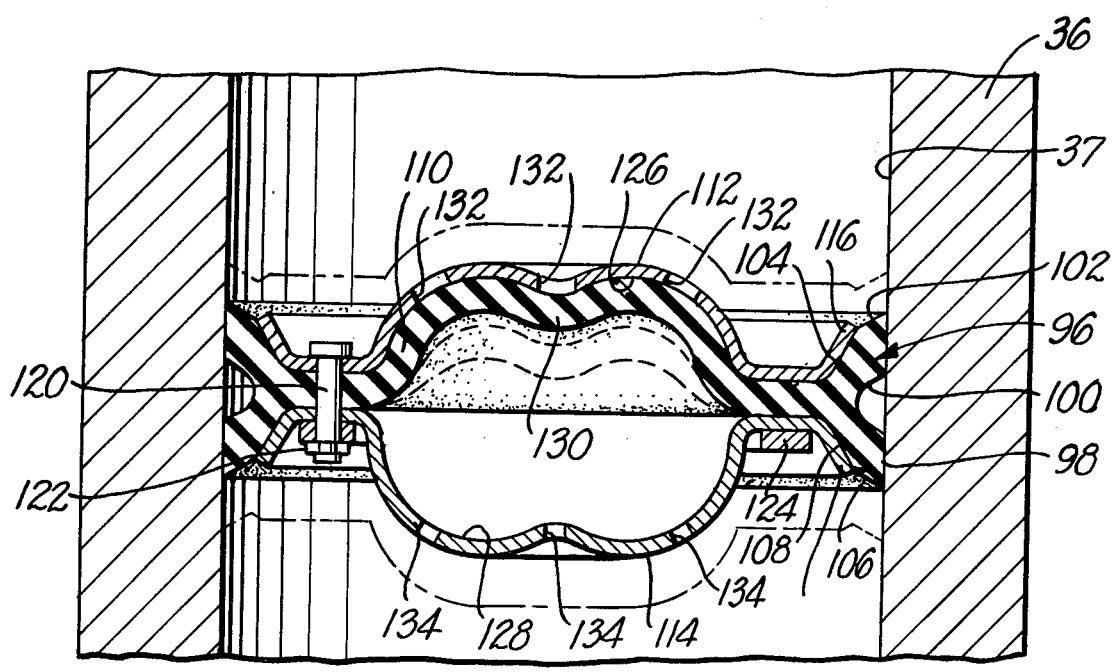

SLIDING SEPARATOR FOR PULSATING LINES

CROSS-REFERENCE TO RELATED PATENTS

This application is related to U.S. Pat. No. 3,893,485 entitled "Pulsation Dampener" and U.S. Pat. No. 4,209,041 entitled "Fluid Pressure Responsive Accessory Equipment" both by Ernest W. Loukonen, and they are hereby incorporated by reference as though fully set forth herein below.

BACKGROUND OF THE PRESENT INVENTION

Some materials, such as the "mud" used in oil well drilling and coal slurry are normally pumped with devices which if undamped can produce cavitation or extreme pressure fluctuations which are destructive to the system through which the materials are pumped. Therefore, pulsation dampeners, such as shown in U.S. Pat. No. 3,893,485 or cavitation eliminators, such as shown in U.S. Pat. No. 4,209,041 are employed to reduce system stress. Unfortunately, in drilling operations where the "mud" is to be pumped down to a drill tip in formations which are sufficiently porous to absorb the "mud", material must be added to the "mud" to prevent its flowing through small cracks in the formation. This material also prevents the "mud" from moving in and out of the energy absorbing screen openings normally used in a pulsation dampener. When coal slurry is pumped, the coal particles tend to separate out in pulsation dampeners and cavitation eliminators to restrict their operation and become a continual maintenance problem. Therefore, there has been a need to provide a device which allows pulsation dampeners or cavitation eliminators to operate in their normal intended manner while separating them from poor flowing, corrosive, abrasive or precipitating materials.

BRIEF DESCRIPTION OF THE PRESENT INVENTION

The present invention is a separator assembly to place between the normal conduit for fluid whose pulsations must be damped and a pulsation dampener or cavitation eliminator which in some embodiments may be incorporated into the separator itself. The separator, includes a cylinder having an opening at one end for connection to the pulsating fluid and an opening at the opposite end for connection to pulsation dampening working fluid. The two fluids are separated by a elastomeric piston whose center forms a diaphragm which is protected from over stress by a pair of cage members on opposite sides thereof. They allow the diaphragm portion of the piston to move in response to relatively high frequency pressure fluctuations while the whole piston moves in response to low frequency pressure changes. In this manner, pulsating energy is transfered out of the pulsating fluid into the working fluid for dissipation.

The rubber piston defines a ring groove about its periphery which mates with a lubrication fitting when the piston is positioned against a piston stop at the pulsating fluid end of the cylinder. A second identical piston stop is provided at the working fluid end of the cylinder so that the device can accommodate abuse due to incorrect initial pressurization, no harm will occur.

The separator is operated by connecting it to the pulsating fluid conduit before pumping therethrough has commenced. The working fluid is then pressurized until the piston is positioned against the stop next to the pulsating fluid conduit. Thereafter the working fluid is pressurized just below the normal average pressure of the pulsating fluid. When the pulsating fluid pressure rises during pumping operations, the sliding piston moves to an intermediate location along the cylinder. Thereafter, high frequency pulsations are passed from fluid to fluid by fluttering of the diaphragm portion of the piston while low frequency pressure changes are passed by movement of the piston along the cylinder. By properly sizing the perforations through the cages on opposite sides of the diaphragm, the device can operate as a pulsation dampener on its own but in that case since no exterior pressure dampener is available to provide resilience, the working fluid must be a compressible fluid such as compressed air.

It is therefore an object of the present invention to provide means for separating a pulsation dampener from corrosive, clogging, particulate, or abrasive fluid having pulsations which must be damped.

Another object is to provide a pulsation dampener which is economic to construct, easy to use and which can be overhauled when necessary with a minimum of down time.

Another object is to provide positive means to protect a pulsation dampener from undesirable material which means neither adversely affect the operation of the pulsation dampener nor make its proper use more difficult.

Another object is to provide a device to extend the life of pulsation dampeners.

Another object is to provide a fluid separator for a pulsation dampener which can be constructed at any scale needed and therefore is adaptable to many different pulsation conditions.

Another object is to provide a fluid separator for a pulsation dampener which can be used with various kinds of pumped fluids and at various pressures without physical modification thereto.

These and other objects and advantages of the present invention will become apparent to those skilled in the art after considering the following detailed specification together with the accompanying drawings wherein:

BRIEF DESCRIPTION OF THE DRAWINGS

FIG. 1 is a perspective view of a device constructed according to the present invention installed between a conduit for pulsating fluid and a pulsation dampener;

FIG. 2 is an enlarged, broken, cross-sectional view taken at line 2—2 of FIG. 1;

FIG. 3 is an enlarged, detailed, cross-sectional view of the elastomeric piston employed in the present invention;

FIG. 6 is an elevational view of a device constructed according to the present invention modified to provide pulsation dampening on its own, shown connected to a conduit for pulsating fluid; and FIG. 7 is a cross-sectional view taken on ine 7—7 of FIG. 6.

DETAILED DESCRIPTION OF THE SHOWN EMBODIMENTS

Figure 4:
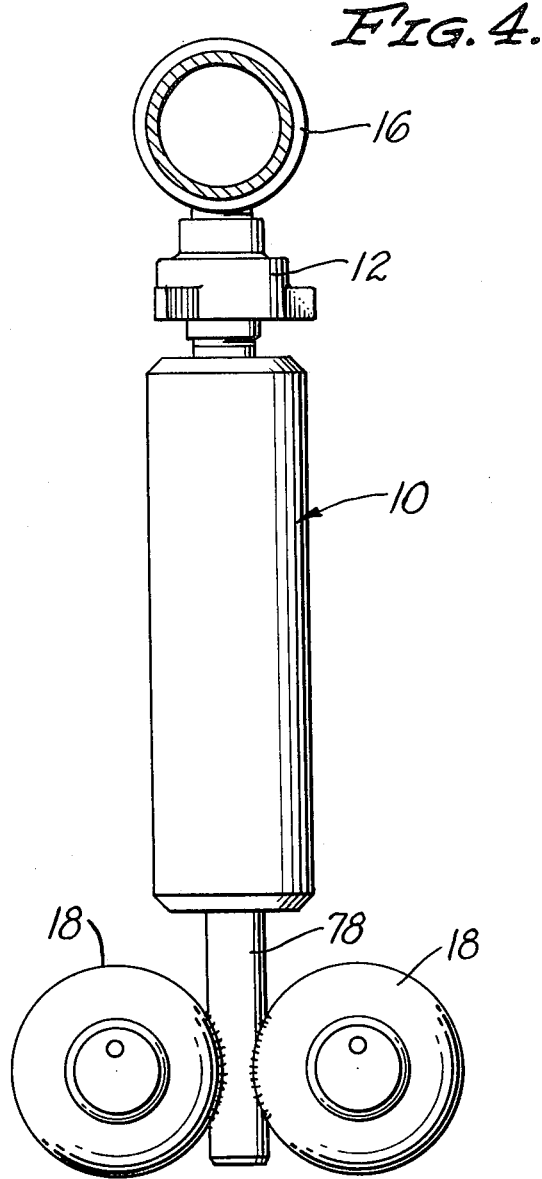
FIG. 4 is an elevational view of a modified version of the present invention permanently connected to a pair of pulsation dampeners.

Referring to the drawings more particularly by reference numbers, number 10 in FIG. 1 refers to a separation device constructed according to the present invention. The device 10 is shown connected by conventional hammer unions 12 and 14 to a pipe 16, through which pulsating fluid 17 is normally pumped and from which pulsations must be damped, and to a pulsation dampener 18 respectively. Heretofore, pulsation dampeners 18 as shown in FIG. 2, have been directly connected to the pipe 16 so that the pulsating fluid 17 therein is free to flow through the inlet 20 thereof and work back and forth through a dampening screen 22 therein which flow is resisted by a bladder 24 whose interior 26 has been suitably pressurized. The dampener 18 includes a body 28 whose interior 30, external of the bladder 24, is prone to fill with particulate matter if such is contained in the pulsating fluid or whose screen 22 tends to clog, corrode or abrade depending upon the nature of the pulsating fluid. Therefore, it is desirable to separate the pulsation dampener 18 from the pulsating fluid 17 when the fluid 17 has undesirable characteristics. As shown in FIG. 2, this is accomplished by placing the separation device 10 of the present invention between the inlet 20 of the pulsation dampener 18 and the outlet 34 of the pipe 16 normally directly connected to the inlet 20.

The separation device 10 includes a cylindrical body 36 having a smooth abrasive resistant, central inner bore 37 which can be treated such as by chromium plating for a long life. The bore 37 is axially aligned and positioned between access bores 38 and 39 which have a slightly larger diameter. The inlet end 40 of the cylindrical body 36 includes an inlet plug disc 42 retained in a releasable position within the access bore 38 by means of inner and outer snap rings 44 and 46 which fit in grooves 48 and 50 respectively in the access bore 38 to bear on the opposite side surfaces 52 and 54 of the disc 42. An O-ring seal 56 is provided in a peripheral groove 58 about the disc 42 to prevent leakage of pulsating fluid therepast. A suitable fluid connection is provided through the disc 42, it being shown as a pipe 60 threadably engaging both the disc 42 and the hammer union 12.

The outlet end 62 of the cylindrical body 36 also includes a disc 64 preferably identical to disc 42 for ease of manufacture and retained in position between inner and outer snap rings 66 and 68 which are in turn retained in grooves 70 and 72 in the access bore 39. The disc 64 also includes a peripheral groove 74 containing an O-ring 76 to provide a seal and prevent escape of working fluid therepast. The disc 64 is connected to the hammer union 14 by a suitable connection such as the pipe 78 which threadably engages both the disc 64 and the hammer union 14.

The snap rings 44 and 66 also trap piston stops 80 and 82 between the shoulders 84 and 86 formed between the bore 37 and the two slightly larger access bores 38 and 39. The stops 80 and 82 are disc-shaped having central openings 88 and 90 therethrough for relatively unrestricted passage of fluid and smaller peripheral openings 92 and 94 for restricting fluid flow to cushion any impact that might occur between the stops 80 and 82 and a separator piston 96 positioned therebetween to ride on the inner bore 37. The piston 96 is shown in greater detail in FIG. 3.

The piston 96 primarily is constructed from an elastomeric material such as rubber and includes a cylindrical outer peripheral surface 98 having a peripheral lubrication groove 100 for retaining lubricant therein. Adjacent the surface 98, the piston 96 includes connected pairs of frustroconical surfaces 102 and 104, and 106 and 108. The outer surfaces 102 and 106 are positioned to engage the stops 88 and 90 respectively and to trap fluid for flow through the peripheral openings 92 and 94. The surfaces 102, 104, 106 and 108 have the effect of reducing the thickness of the piston 96 to form a center diaphragm 110. The diaphragm 110 is protected between a pair of cage members 112 and 114 on opposite sides of the piston 96 which mate at their outer peripheries 116 and 118 with the frustroconical surfaces 104 and 108 of the piston 96 respectively. The cages 112 and 114 are retained together by a plurality of pins 120 extending therebetween through the diaphragm 110 and radially inside the surfaces 104 and 108. Preferably the pins 112 are in turn fixed by snap rings 122 thereon which act against a retaining ring 124 to prevent abrasion of the cage 114 yet allow easy replacement of the rubber piston 96 when it becomes worn.

The cages 112 and 114 include cup-shaped centers 126 and 128 which retain a cup-shaped center portion 130 of the diaphragm 110. The center portion 130 is molded to have essentially an unstressed condition when resting against either of the cage centers 126 and 128. The cages 112 and 114 themselves include perforations 132 and 134 which may be differently sized and provided in sufficent number to accommodate the fluid which is to pass therethrough. For example, in FIG. 3, the perforations 132 of cage 112 are relatively large so that treated drilling "mud" is able to pass therethrough whereas the perforations 134 in cage 114 need not be as large because of the better flow characteristics of the working fluid passing therethrough. When in normal operation, relatively high frequency pulsations in the pulsating fluid 17 pass through the piston 96 by a fluttering movement of the diaphragm 110, shown in dashed outline in FIG. 3. Low frequency pulsations are accommodated by movement of the entire piston 96 as shown by the phantom outlines in FIG. 3.

When it is desired to install the device 10, it is connected to the pulsation dampener 18 by means of the union 14, a fill plug 136 (FIG. 2) of the dampener 18 is removed and the interior 30 of the dampener 18 is filled with a suitable working fluid whether it be oil, water or gas with the piston 96 in contact with the stop 80. With the piston 96 in this location suitable lubricant can be introduced into the groove 100 through a lubricant fitting 138 positioned in the cylindrical body 36 for that purpose. Thereafter the pressure within the bladder 24 is increased to a proper value which is below the expected normal operating pressure within the pipe 16. Pressure tables can be provided for all standard installations when the device 10 is originally sold to indicate the proper pressure. The device 10 is then connected by means of the union 12 to the pipe 16 and pumping is begun. As the average pressure within the pipe 16 increases, the piston 96 moves down to a central location within the cylindrical body 36 which position is determined by the relative volumes of the device 10 and the components of the pulsation dampener 18, the initial pressure within the bladder 24, and the average pressure within the pipe 16. It is possible to determine that the value taken from the pressure tables was correct by opening an optional sensor port 139 connected at the midpoint of the body 36. If working fluid flows out of the port 139 when it is opened, the initial pressure was too low and if pulsating fluid 17 flows out, the initial pressure was too high. Thereafter high frequency pulsations are passed to the pulsation dampener 18 by the diaphragm 110 whereas low frequency pulsations are passed by movement of the piston 96 within the inner bore 37. This provides a complete separation of the pulsation fluid 17 from the working fluid to prevent the pulsating fluid 17 from interfering with the proper operation of the pulsation dampener 18 while protecting the diaphragm 110 from excessive low frequency pressure which otherwise might damage it.

Figure 5:
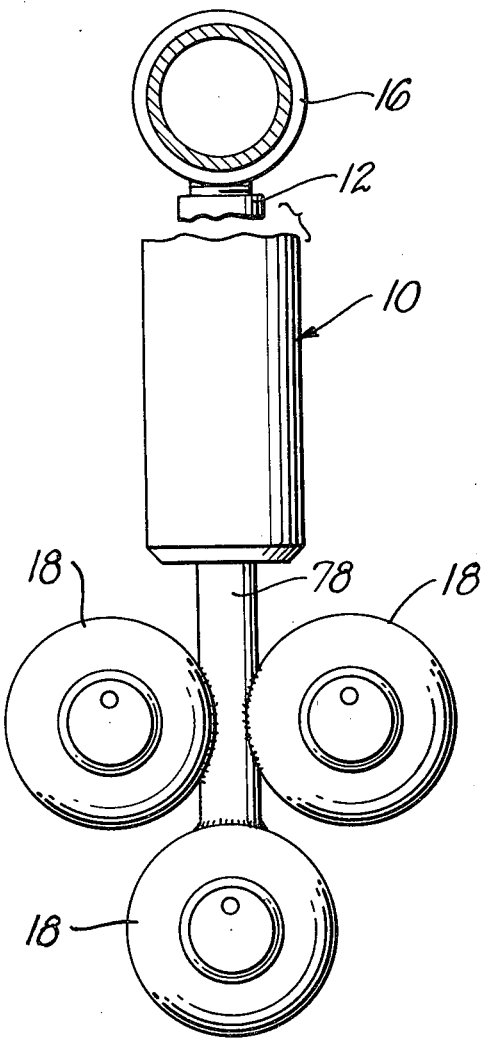
FIG. 5 is an elevational view of a modified version of the present invention permanently connected to three pulsation dampeners.

In some instances, one standard-size pulsation dampener 18 may not be sufficient to dampen out pulsations of large magnitude. Therefore, more than one pulsation dampener 18 may be connected to the outlet pipe 78 of the device 10 as shown in FIGS. 4 and 5. As shown, the pipe 78 may connect directly to the pulsation dampeners 18 rather than being quickly disconnectable therefrom by means of a hammer union. In this case, the separator 10 and dampener 18 are manufactured and sold as a single unit which makes the aforementioned pressure tables less complex.

In some instances, it is possible to use the separation device 10 of the present invention as a pulsation dampener itself with slight modification. This is shown in FIGS. 6 and 7 wherein a gas fill valve 140 has been substituted for the outlet pipe 78. In this instance, since the high frequency pulsation dampening must occur by passage of the pulsating fluid 17 through the cage 112 and the passage of pressurizing gas 142 through the cage 114, the perforations 132 and 134 thereof may have great disparity in size and number. Of course, a compressible fluid, such as gas 142, must be used within the cylindrical body 36 between the piston 96 and the outlet disc 64, since otherwise hydraulic lockup would occur.

To operate the device 10 of FIGS. 6 and 7, the compressible working fluid 142 is introduced at sufficient pressure to move the piston 96 to the upward location as before, but its pressure and the volume within the cylindrical body 36 must be correct to assure that the piston 96 moves to a central location upon pressurizing of the pipe 16 to its average pressure. Thereafter, like before, the diaphragm 110 flutters to accommodate high frequency pulsations, whereas movement of the piston 96 with or against the pressure of the working fluid 142 is used to damp out lower frequency pulsations by friction between the piston 96 and the inner bore 37.

Thus there has been shown and described a novel separation and pulsation dampening device which fulfills all the objects and advantages sought therefore. Many changes, modifications, variations and other uses and applications of the invention will however become apparent to those skilled in the art after considering the foregoing specification together with the accompanying drawings and claims. All such changes, modifications, variations and other uses and applications which do not depart from the spirit and scope of the invention are deemed to be covered by the invention which is limited only by the claims which follow.

What is claimed is:

1. A separator to isolate a pulsating fluid from a pulsation damping fluid which passes pulsating energy therebetween including:
   a body defining an inner cylindrical bore therein, said defined inner cylindrical bore having:
      a first end for connection to the pulsating fluid; and
      a second end for connection to the pulsation damping fluid;
   a piston positioned in said defined inner cylindrical bore, said piston having:
      a central diaphragm for passing high frequency energy pulsations between the pulsating fluid and the pulsation damping fluid;
      a outer cylindrical surface positioned to slide on said defined inner cylindrical bore, whereby said piston can move on said defined inner cylindrical bore to pass low frequency energy pulsations between the pulsating fluid and the pulsation damping fluid;
      a first side facing toward the pulsating fluid;
      a second side facing toward the pulsation damping fluid;
      a first cage on said first side of said piston shaped to allow limited movement of said diaphragm toward said first end of said defined inner cylindrical bore, said first cage including:
         a central cup shaped portion to allow limited movement of said diaphragm toward said first end of said defined inner cylindrical bore; and
         a plurality of first perforations to allow movement of the pulsating fluid therepast to act on said diaphragm; and
      a second cage on said second side of said piston shaped to allow limited movement of said diaphragm toward said second end of said defined inner cylindrical bore, said second cage including:
         a central cup shaped portion to allow limited movement of said diaphragm toward said second end of said defined inner cylindrical bore; and
         a plurality of second perforations to allow movement of the pulsation damping fluid therepast to be acted upon by said diaphragm; and
   a sensor port positioned through said defined inner cylindrical bore generally equidistant from said first and second ends thereof, said sensor port being manually openable whereby any fluid flowing out thereof indicates the position of said piston along said defined inner cylindrical bore.

2. The separator defined in claim 1 wherein said first perforations of said plurality of first perforations are larger than said second perforations of said plurality of second perforations.

3. The separator defined in claim 1 further including:
   a lubricant fitting positioned through said defined inner cylindrical bore adjacent said first end thereof, said outer cylinderical surface of said piston including:
   a circumferential lubricant groove formed thereabout which is positioned to receive lubricant from said lubricant fitting when said first frustro-conical surface is in abutment with said first piston stop.

4. The separator defined in claim 1 further including:
   at least one pulsation dampener operatively connected by pulsation damping fluid to energy passed by said piston.

5. The separator defined in claim 4 wherein said at least one pulsation dampener includes:
   means to fill said separator with pulsation damping fluid on said second side of said piston.

6. A separator to isolate a pulsating fluid from a pulsation damping fluid which passes pulsating energy therebetween including:

a body defining an inner cylindrical bore therein, said defined inner cylindrical bore having:
  a first end for connection to the pulsating fluid; and
  a second end for connection to the pulsation damping fluid;
a lubricant fitting positioned through said defined inner cylindrical bore adjacent said first end thereof;
a piston positioned in said defined inner cylindrical bore, said piston having:
  a central diaphragm for passing high frequency energy pulsations between the pulsating fluid and the pulsation damping fluid;
  a outer cylindrical surface positioned to slide on said defined inner cylindrical bore, whereby said piston can move on said defined inner cylindrical bore to pass low frequency energy pulsations between the pulsating fluid and the pulsation damping fluid;
  a first side facing toward the pulsating fluid;
  a second side facing toward the pulsation damping fluid;
  a first cage on said first side of said piston shaped to allow limited movement of said diaphragm toward said first end of said defined inner cylindrical bore, said first cage including:
    a central cup shaped portion to allow limited movement of said diaphragm toward said first end of said defined inner cylindrical bore; and
    a plurality of first perforations to allow movement of the pulsating fluid therepast to act on said diaphragm; and
  a second cage on said second side of said piston shaped to allow limited movement of said diaphragm toward said second end of said defined inner cylindrical bore, said second cage including:
    a central cup shaped portion to allow limited movement of said diaphragm toward said second end of said defined inner cylindrical bore; and
    a plurality of second perforations to allow movement of the pulsation damping fluid therepast to be acted upon by said diaphragm;
a first piston stop positioned adjacent said first end of said defined inner cylindrical bore; and
a second piston stop positioned adjacent said second end of said defined inner cylindrical bore, said piston further including:
  a first frustro-conical surface adjacent said outer cylindrical surface thereof sloping radially inwardly toward said diaphragm and positioned for abutment with said first piston stop; and
  a second frustro-conical surface adjacent said outer cylindrical surface thereof sloping radially inwardly toward said diaphragm and positioned for abutment with said second piston stop, said outer cylindrical surface of said piston including:
    a circumferential lubricant groove formed thereabout which is positioned to receive lubricant from said lubricant fitting when said first frustro-conical surface is in abutment with said first piston stop.

7. The separator defined in claim 6 further including:
a plurality of fasteners passing through said piston and said first and second cages to retain said piston and said first and second cages together.

8. The separator defined in claim 6 wherein said piston is constructed from elastomeric material.

9. The separator defined in claim 6 wherein said diaphragm includes:
a center portion molded to rest against said central cup shaped portion of said first cage and against said central cup shaped portion of said second cage in essentially unstressed conditions.

10. The separator defined in claim 6 wherein said piston further includes:
a third frustro-conical surface adjoining said first frustro-conical surface thereof, said third frustro-conical surface sloping radially inwardly toward said diaphragm; and
a fourth frustro-conical surface adjoining said second frustro-conical surface thereof, said fourth frustro-conical surface sloping radially inwardly toward said diaphragm, and wherein said first cage includes:
a frustro-conical surface mating with and supporting said third frustro-conical surface of said piston, and wherein said second cage includes:
a frustro-conical surface mating with and supporting said fourth frustro-conical surface of said piston.

* * * * *